United States Patent
Shute et al.

(10) Patent No.: US 7,828,552 B2
(45) Date of Patent: Nov. 9, 2010

(54) METHOD AND SYSTEM FOR DESIGNING ADAPTIVE, DIAGNOSTIC ASSESSMENTS

(75) Inventors: Valerie J. Shute, Tallahassee, FL (US); Eric G. Hansen, Fairless Hills, PA (US); Russell G. Almond, Lawrenceville, NJ (US)

(73) Assignee: Educational Testing Service, Princeton, NJ (US)

( * ) Notice: Subject to any disclaimer, the term of this patent is extended or adjusted under 35 U.S.C. 154(b) by 2 days.

(21) Appl. No.: 11/359,232

(22) Filed: Feb. 22, 2006

(65) Prior Publication Data
US 2006/0286533 A1 Dec. 21, 2006

Related U.S. Application Data

(60) Provisional application No. 60/654,982, filed on Feb. 22, 2005.

(51) Int. Cl.
*G09B 19/00* (2006.01)
(52) U.S. Cl. .................. 434/118; 434/236; 434/322; 434/350
(58) Field of Classification Search .......... 434/118, 434/236, 322, 362, 353, 323, 327, 350, 354
See application file for complete search history.

(56) References Cited

U.S. PATENT DOCUMENTS

| | | | | | |
|---|---|---|---|---|---|
| 5,059,127 | A | * | 10/1991 | Lewis et al. | 434/353 |
| 5,437,553 | A | * | 8/1995 | Collins et al. | 434/322 |
| 5,597,312 | A | * | 1/1997 | Bloom et al. | 434/362 |
| 5,727,950 | A | * | 3/1998 | Cook et al. | 434/350 |
| 6,144,838 | A | * | 11/2000 | Sheehan | 434/362 |
| 6,146,148 | A | * | 11/2000 | Stuppy | 434/322 |
| 6,164,975 | A | * | 12/2000 | Weingarden et al. | 434/322 |
| 6,592,379 | B1 | * | 7/2003 | Stuppy | 434/322 |
| 6,634,887 | B1 | * | 10/2003 | Heffernan et al. | 434/322 |
| 6,666,687 | B2 | * | 12/2003 | Stuppy | 434/322 |
| 6,729,885 | B2 | * | 5/2004 | Stuppy et al. | 434/322 |
| 6,733,295 | B2 | * | 5/2004 | Stuppy et al. | 434/322 |
| 6,733,296 | B2 | * | 5/2004 | Tojek et al. | 434/322 |
| 6,749,434 | B2 | * | 6/2004 | Stuppy | 434/322 |
| 6,755,661 | B2 | * | 6/2004 | Sugimoto | 434/322 |
| 6,795,684 | B2 | * | 9/2004 | Stuppy | 434/362 |

(Continued)

OTHER PUBLICATIONS

International Application of PCT Application No. PCT/US2006/006226, Oct. 12, 2007, 1 page.

(Continued)

*Primary Examiner*—Xuan M Thai
*Assistant Examiner*—Kang Hu
(74) *Attorney, Agent, or Firm*—Jones Day

(57) ABSTRACT

A method and system for administering an assessment to a student are disclosed. The expected weight of evidence may be calculated for each of one or more tasks based on a student model pertaining to a student. A task may be selected based on the calculated expected weights of evidence. The selected task may be administered to the student, and evidence may be collected regarding the selected task. The student model pertaining to the student may be updated based on the evidence. A determination of whether additional information is required to assess the student may be made. If additional information is required to assess the student, the above steps may be repeated. Otherwise, a proficiency status may be assigned to the student based on the student model.

20 Claims, 7 Drawing Sheets

Assessment Design

Student Model(s)

Evidence Models

Task Models

Diagnostic Inferences

U.S. PATENT DOCUMENTS 6,804,489 B2 * 10/2004 Stuppy et al. ............... 434/350
2004/0202987 A1 * 10/2004 Scheuring et al. ........... 434/118

OTHER PUBLICATIONS

Bloom, Learning for Mastery, 1968, Evaluation Comment 1(2):1-12.
Bloom, The 2-Sigma Problem: The Search for Methods of Group Instruction as Effective as One-to-One Tutoring, 1984, Educational Researcher 13(6):4-16.
Tobias, Interest, Prior Knowledge and Learning, 1994, Review of Educational Research 64(1):37-54.
Almond et al., Enhancing the Design and Delivery of Assessment Systems: A Four Process Architecture, 2002, J. Tech., Learning and Assessment 1(5), http://www.bc.edu/research/intasc/jtla/journal/pdf/v1n5_itla.pdf.
American Educational Research Association, American Psychological Association & National Council on measurement in Education [AERA, APA & NCME], 1999, Standards for Educational & Psychological Testing, Washington, DC, American Educational Res. Assoc.
Bejar, A Generative Approach to Psychological and Educational Measurement, In Test Theory for a New Generation of Tests, Fredericksen et al. eds., Hillsdale, NJ, Lawrence Erlbaum, pp. 323-359, 1993.
Bejar, Generative Testing: From Conception to Implementation, In Item Generation for Test Development, Irvine et al. eds., Mahwah, NJ, Lawrence Erlbaum Assoc. Pub., pp. 199-218, 2002.
Beyer, CRC Standard Mathematical Tables, Beyer ed., CRC Press, Inc., Boca Raton, 1984 (TOC).
Chisholm et al., Web content accessibility guidelines (W3C recommendation), May 5, 1999, from http://www.w3.org/TR/WAIWEBCONTENT, 1999.
Cronbach et al., Aptitudes and instructional methods: A handbook for research on interactions, Irvington Publishers, Inc. NY, 1977 (TOC).
Good et al., The Diagnostic Process with Special Reference to Errors, 1971, Method of Inferential Medicine, 10(3):176-188.
Hansen et al., Accessibility of tests for individuals with disabilities within a validity framework, 2005, System: An International J. of Ed. Technology and Appl. Linguistics 33:107-133.
IMS Global Learning Consortium, IMS guidelines for developing accessible learning applications, Sep. 9, 2002, http://imsproject.org/accessibility/accv1-p0/imsacc_guidev1p0.html.
International Study Center at Boston College, Third International Mathematics and Science Study (TIMSS) highlights from the final year of secondary school, Nov. 10, 2004, http://timss.bc.edu/timss1995/HiLightC.html, 1998.
Landau et al., Use of the Talking Tactile Tablet in Mathematics Testing, J. Visual Impairment and Blindness 97(2):85-96, Nov. 11, 2004 http://www.touchgraphics.com/publications/article.pdf.
Madigan et al., Graphical Explanation in Believe Networks, 1997, J. Computational & Graphical Statistics, 6(2):160-181.
Mislevy et al., The Role of Probability-Based Inference in an Intelligent Tutoring System, 1996, User-Modeling and User-Adapted Interaction, 5:253-282.
Mislevy et al., Evidence-Centered Assessment Design, 1999a, Oct. 5, 2004, http://www.education.umd.edu/EDMS/mislevy/papers/ECD_overview.html.
Mislevy et al., On the Roles of Task Model Variables in Assessment Design (CSE Technical Rep. No. 500), 1999b, Oct. 4, 2004, http://www.cse.ucla.edu/CRESST/Reports/TECH500.pdf.
Mislevy et al., On the Structure of Educational Assessments, 2003, Measurement: Interdisciplinary Research and Perspectives 1(1):3-62.
Mislevy et al., Evidence-Centered Assessment Design, A Submission for the NCME Award for Technical or Scientific Contributions to the Field of Educational Measurement, 2000, Retrieved Nov. 12, 2004, http://www.ncme.org/about/awards/mislevy.html.
Mislevy et al., Bayes Nets in Educational Assessment: Where the Numbers Come From, 1999, in Proceedings of the fifteenth conference on uncertainty in artificial intelligence, Laskey et al. eds., San Francisco, CA, Morgan Kaufmann, pp. 437-446.
Mory, Feedback Research Revisited, 2004, In Handbook of Research on Educational Communications and Technology, Jonassen ed., Mahwah, NJ, Erlbaum, pp. 745-783.
National Assessment Governing Board, Mathematics framework for the 2003, 2002, Washington, DC: National Assessment of Educational Progress [NAGB], Nov. 1, 2004, http://www.nagb.org/pubs/math_framework/toc.html.
National Center for Educational Statistics, Highlights from the Third International Mathematics and Science Study-Repeat (TIMSS-R), 2001, Washington, DC: US Department of Education, Nov. 11, 2004, http://nces.ed.gov/timss/timss-r/highlights.asp#1.
National Council of Teachers of Mathematics, Principles and Standards for School Mathematics, 2000, Reston, VA: NCTM (TOC).
National Research Council (US), Keeping Score for All: The effects of inclusion and accommodation policies on large-scale educational assessment, 2004, Washington, DC: National Academies Press.
New Jersey Department of Education, New Jersey core curriculum content standards for mathematics, 2004, Oct. 5, 2004, http://www.state.nj.us/njded/cccs/s4_math.htm#43.
Shute et al., Individualized and Group Approaches to training, 2000, In Training and retraining: A handbook for business, industry, government, and the military, 2000, Tobias et al. eds., New York, NY, Macmillan, pp. 171-207.
Shute, A Comparison of Learning Environments: All That Glitters . . . 1993, in Computers as cognitive tools, Lajoie et al. eds., Hillsdale, NJ, Lawrence Erlbaum Associates, pp. 47-74.
Singley et al., Item Generation and Beyond: Applications of Schema Theory to Mathematics Assessment, 2002, In Item Generation for Test Development, Irvine et al. eds., Mahwah, NJ, Lawrence Erlbaum Assoc., pp. 361-384.
Snow, Aptitude Theory: Yesterday, Today and Tomorrow, 1992, Educational Psychologist 27(1):5-32.
Thompson et al., Universal Design Applied to Large Scale Assessments (Synthesis Report 44), 2002, Minneapolis, MN: University of Minnesota, National Center on Educational Outcomes, Oct. 27, 2003, http://education.umn.edu/NCEO/OnlinePubs/Synthesis44.html.
Thompson et al., Access to Computer-Based Testing for Students with Disabilities (Synthesis Report 45), 2002, Minneapolis, MN: University of Minnesota, national Center on Educational Outcomes, Feb. 6, 2004, http://education.umn.edu/NCEO/OnlinePubs/Synthesis45.html.
Tobias, Interest, Prior Knowledge, and Learning, 1994, Review of Educational Research 64(1):37-54.
Bennett; Computer-based testing for examinees with disabilities: On the road to generalized accommodation (RM-95-1); Princeton, NJ: Educational Testing Service; 1995.
Graf; Designing a Proficiency Model and Associated Item Models for an 8th Grade Mathematics Unit on Sequences; Math Forum, Princeton, NJ: Educational Testing Service; 2003.
Graf, et al.; Using an item modeling approach to develop mathematics assessment items for an 8th-grade unit on sequences; 2003.
Hansen, et al.; Evidence-centered assessment design and individuals with disabilities; In E.G. Hansen (Organizer), Assessment design and diverse learners: Evidentiary issues in disability, language, and non-uniform testing conditions; Symposium at Annual Meeting of the Nat'l Council on Measurement in Education; Chicago, Illinois; 2003.
Hansen, et al.; Toward a unified validity frame work for ensuring access to assessments by individuals with disabilities and English language learners; Paper at Annual Meeting of the National Council on Measurement in Education (NCME); San Diego, California; 2005.
Fisher, et al.; Lecture Notes in Statistics, Learning from Data, Artificial Intelligence and Statistics V; 1996.
Bejar, et al.; A feasibility study of on-the-fly item generation in adaptive testing (GRE Report 98-12); Princeton, NJ: Educational Testing Service; 2002.
Daisy Consortium; Frequently asked questions; http://www.daisy.org/about_us/g_faq.asp; 2004.
Heath, et al.; Guidelines for testing and assessment; In IMS Global Learning Consortium (eds.); IMS guidelines for developing accessible learning applications; 2004.
International Study Center at Boston College; Third International Mathematics and Science Study (TIMSS) highlights from the final year of secondary school; 1998.
Office of Educational Research and Improvement; Statistical highlights of student achievement (memo); Washington, D.C. Department of Education; 2001.
Rothberg, et al.; Making educational software accessible: Design guidelines including math and science solutions (CD-ROM access project); Boston, MA: WGBH Educational Foundation; 2000.

* cited by examiner

METHOD AND SYSTEM FOR DESIGNING ADAPTIVE, DIAGNOSTIC ASSESSMENTS

CROSS-REFERENCE TO RELATED APPLICATIONS

This application claims priority to, and incorporates herein by reference in its entirety, U.S. Provisional Application No. 60/654,982, entitled "Designing Adaptive, Diagnostic Math Assessments for Sighted and Visually Disabled Students" and filed on Feb. 22, 2005.

BACKGROUND

In the United States, student difficulties in mathematics tend to emerge in middle school. For example, the results from a study regarding trends in international mathematics and science indicate that while U.S. fourth graders perform above the international average in mathematics, U.S. eighth-grade students perform at or below the international average. By the end of high school, U.S. students perform far below the international average.

In part, this downward trend among U.S. students may result from a shift in the content that is being presented. Until the fourth grade, mathematics focuses on arithmetic instruction. In middle school, the mathematics curriculum typically becomes more visual (e.g., students learn to interpret and construct graphs) and more abstract (e.g., students learn to interpret and represent algebraic expressions).

One problem with current teaching methods is that by the time results of high-stakes accountability tests are disseminated, classroom teaching methods cannot generally be changed to address weak areas or misconceptions of students. For example, if students in a particular class have difficulty understanding and applying the quadratic equation and such deficiency and/or misconception is discovered upon the administration of a high-stakes examination or an examination presented at the end of a semester or other grading period, the ability of the teacher to receive and comprehend the results and incorporate this knowledge into a lesson plan is difficult given an established course curriculum. In contrast, determining that the deficiency and/or misconception exists while the material is being taught could permit additional or varied instruction to be provided in a classroom setting. Accordingly, enhancing student learning of mathematics material that is more visual and more abstract may permit students to actively solve problems and receive timely diagnostic feedback that can further the learning process.

In addition, some students can be heavily impacted by the emphasis on graphic and/or abstract mathematics. For example, the increased visual nature of the content can provide a distinct disadvantage to students that are interested in mathematics, but have visual disabilities.

Presenting alternative representations of the same or similar concepts in tasks, examples, and the like can augment comprehension and accommodate various disabilities. For example, when transforming content from a visual format to an auditory format, it is important to provide representations that convey the same meaning. In this manner, no student is unfairly advantaged or disadvantaged because of the format of the assessment task. For example, the notion of providing equivalent representations is a central requirement of the World Wide Web Consortium's (W3C) Web Content Accessibility Guidelines. Under these guidelines, Web content authors provide text equivalents or text descriptions for non-text content (images, audio, video, animations, etc.).

Such text equivalents are rendered as visually displayed text, audio and/or Braille. Furthermore, audio presentations are carried out by having the text description read aloud via a live reader, pre-recorded audio or synthesized speech. However, the use of a text description rendered in audio to convey the meaning of a graph for a person who is blind can be confusing. Such an audio representation can exceed certain of the test taker's cognitive capacities. For example, a text representation of FIG. 1 could read as follows:

This figure shows a straight line drawn on a two-axis system, with a horizontal axis labeled X and a vertical axis labeled Y. All four quadrants are shown. The line begins in the third quadrant and moves upward and to the right; it crosses the negative X-axis, passes through the second quadrant, crosses the positive Y-axis, and ends in the first quadrant. Three points are shown, two on the line and one in the fourth quadrant. The point on the line in the first quadrant is labeled X, Y; the point on the line in the third quadrant is labeled X-sub-one, Y-sub-one. The point in the fourth quadrant is labeled X, Y-sub-one. In addition, two dashed line segments are shown, one that drops vertically from the point X, Y and connects it to the point X, Y-sub-one, and one that moves horizontally to the right from the point X-sub-one, Y-sub-one and connects it to the point X, Y-sub-one. This forms a right triangle with the solid line as a hypotenuse, the horizontal dashed line as the base, and the vertical dashed line as a side.

Navigating through the audio presentation can be cumbersome, regardless of whether, for example, a live reader is asked to repeat portions of the presentation or a pre-recorded audio presentation is navigated from a cassette tape. However, improvements can be obtained. The student can be allowed to control the rate of speech and to navigate through the content in different ways (e.g., sentence by sentence or word by word). A pre-recorded audio presentation can be similarly improved over an audiocassette by providing similar navigation capabilities, such as through a digital talking book technology. If the student reads Braille, the text description of the graphic can be conveyed via Braille in either a hard copy or refreshable format.

However, a limitation of all of these approaches is that they merely provide access to the text description of the graphic rather than to the graphic itself.

What is needed is a system and method of applying an evidence-centered design (ECD) approach to task development to further the learning process.

A need exists for an adaptive algorithm for task selection that can be used with an ECD system.

A need exists for a system and method of providing assessment services, adaptive e-learning and diagnostic reports.

A further need exists for a system and method that provides reasonable accommodations to students that would otherwise be prevented from learning or being assessed due to the nature of the particular subject matter.

The present disclosure is directed to solving one or more of the above-listed problems.

SUMMARY

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope.

It is also noted that as used herein and in the appended claims, the singular forms "a," "an," and "the" include plural references unless the context clearly dictates otherwise. Thus, for example, reference to a "task" is a reference to one or more tasks and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. All publications mentioned herein are incorporated by reference. Nothing herein is to be construed as an admission that the embodiments described herein are not entitled to antedate such disclosure by virtue of prior invention.

Enhancing student learning of mathematics material that is more visual and more abstract may permit students to actively solve problems and receive timely diagnostic feedback. In addition, presenting alternative representations of the same or similar concepts in tasks, examples, and the like may augment comprehension and accommodate various disabilities. Adjusting learning environments and/or content to suit an individual student's needs may substantially improve learning as well.

In an embodiment, a method of administering an assessment to a student may include calculating the expected weight of evidence for each of one or more tasks based on a student model pertaining to a student, selecting a task based on the calculated expected weights of evidence, administering the selected task to the student, collecting evidence regarding the selected task, updating the student model pertaining to the student based on the evidence, and determining whether additional information is required to assess the student. If additional information is required to assess the student, the above steps may be repeated to select and administer a new task. Otherwise, a proficiency status may be assigned to the student based on the student model.

In an embodiment, a processor-readable storage medium may contain one or more program instructions for performing a method of administering an assessment to a student. The method may include calculating the expected weight of evidence for each of one or more tasks based on a student model pertaining to a student, selecting a task based on the calculated expected weights of evidence, administering the selected task to the student, collecting evidence regarding the selected task, updating the student model pertaining to the student based on the evidence, and determining whether additional information is required to assess the student. If additional information is required to assess the student the above steps may be repeated. Otherwise, a proficiency status may be assigned to the student based on the student model.

BRIEF DESCRIPTION OF THE DRAWINGS

Aspects, features, benefits and advantages of the embodiments described herein will be apparent with regard to the following description, appended claims and accompanying drawings where:

DETAILED DESCRIPTION

Figure 1:
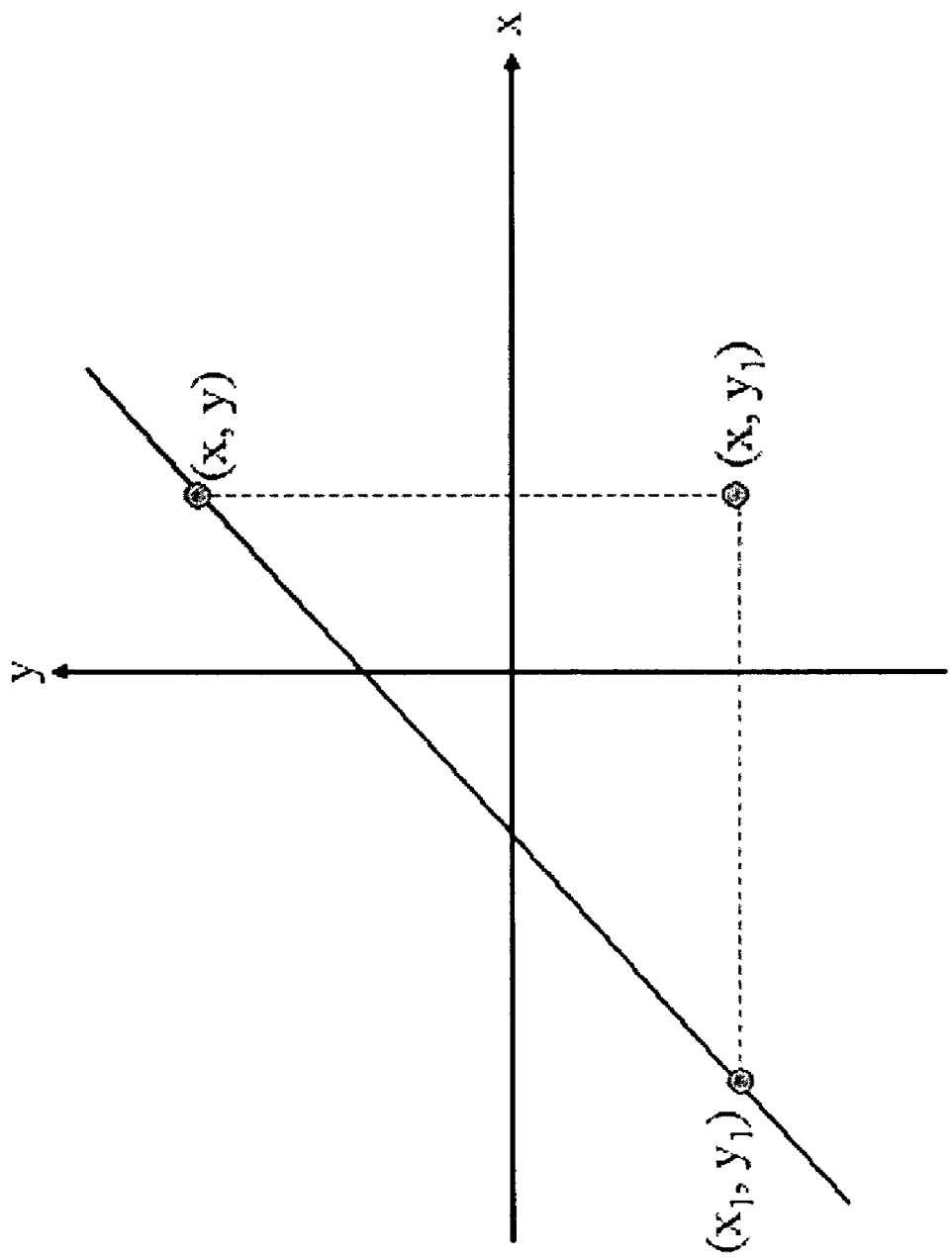
FIG. 1 depicts a diagram used in an exemplary task.

An "adaptation" or "adaptive capability" may include a system's capability to adjust itself to suit particular characteristics of a learner and may include the customization of instructional material (e.g., content selection, sequencing and/or format) to suit different learner characteristics.

"E-learning" or "electronic learning" may include the delivery of any instructional and/or training program using one or more interactive computer-based technologies. E-learning may be used where networking or distance communications are involved. For example, e-learning may include, without limitation, distance learning and/or Web-based learning.

A "task" or an "item" may each include a question that elicits and/or prompts for an answer and/or a response.

Adjusting learning environments and/or content to suit an individual student's needs may substantially improve learning. Aptitude-treatment interaction (ATI) may be used to further a student's understanding of mathematics material. In ATI, aptitude may refer to any individual characteristic that accounts for the level of student performance in a given environment, and treatment may refer to the variations in, for example, the pace, format and/or style of instruction. Different treatments may be more or less suited to different combinations of student characteristics. For example, if it is known that a person cannot process visual information, but can hear well, and equivalent content is available in visual and auditory formats, ATI may recommend that the content be delivered in the auditory format for that person.

Methods of customizing content may include determining what to present (referred to herein as microadaptation) and determining how to best present it (referred to herein as macroadaptation). Microadaptation has been a fairly elusive goal among educators for some time, as can be seen in Bloom, B. S., "Learning for Mastery," *Evaluation Comment*, vol. 1(2), pp 1-12 (1968); Bloom, B. S., "The 2-Sigma Problem: The Search for Methods of Group Instruction as Effective as One-to-One Tutoring," *Educational Researcher*, vol. 13(6) pp 4-16 (1984); and Tobias, S., "Interest, Prior Knowledge, and Learning," *Review of Educational Research*, vol. 64(1), pp 37-54 (1994). However, as described herein, an embodiment incorporating differential sequencing of content depending on each learner's needs may be implemented using adaptive instructional techniques.

Microadaptation may be one method for customizing content. Microadaptation may include the real-time selection of content (i.e., during the learning process) in response to a learner's inferred knowledge and skill state. Microadaptation may also be referred to as domain-dependent adaptation. According to microadaptation principles, decisions about content selection may be based upon performance and subsequent inferences of students' knowledge and skill states as compared to the level that should have been achieved when instruction is complete. For example, if a student incorrectly solves a difficult assessment task pertaining to a particular concept or skill, a plurality of alternatives may be indicated to increase the student's skill, such as presenting new instructional material on the concept, administering a slightly easier assessment task directed to evaluating the same proficiency, and the like. Alternatively, additional practice or remedial instruction may be warranted. When a student is believed to have mastered a particular topic or otherwise achieved an "acceptable" level of performance, the student may be guided to new subject matter.

A second approach to adapting content may be macroadaptation, which may include the customization of content according to more stable learner qualities, such as cognitive or perceptual abilities. In contrast with microadaptation, macroadaptive decisions may be domain-independent and based on learner information that is usually, but not always, collected before instruction begins. Macroadaptation may relate to decisions about the format and/or sequence of the content presented to the learner. Relevant learner information, such as cognitive variables, perceptual abilities, personality variables, and learning style, may be initially collected from a student. Subsequently, these data may be used to make informed decisions regarding the type of content or instructional environment that is best suited to the individual.

An implementation that considers these two forms of adaptation may be used to substantially improve the learning process. Microadaptation may be used to determine what to present to a learner and when to present it. For example, a microadaptive algorithm may select an assessment task that provides the most additional information about a particular learner at any given point in a learning and/or assessment process. In contrast, macroadaptation may be used to determine how it should be presented. For example, an assistive technology may be used to present mathematical content to students with visual disabilities. Table 1 summarizes some general differences between microadaptive and macroadaptive approaches.

taking the assessment, (b) what observations (behaviors or work products) provide the best evidence for these determinations, and (c) what kinds of tasks allow necessary observations to be made or pertinent evidence to be collected. For example, suppose a measure of students' knowledge of U.S. state capitals is desired. Evidence of high proficiency may include a given student correctly listing the names of all capital cities by state. This evidence may be obtained orally, on paper and/or via computer using free recall and/or matching tasks. The ensuing score on this assessment may be interpreted in relation to pre-established scoring rules.

In order to apply an ECD framework to the design of assessment tasks, a subject matter expert, such as a teacher or test developer, may create, for example, three models: (a) a student model, which may define the range and relationships of the knowledge and skills to be measured, (b) an evidence model, which may specify the performance data associated with these knowledge and skills for varying levels of mastery, and (c) a task model, which may define the features of task performance situations that may elicit relevant evidence.

Figure 2:
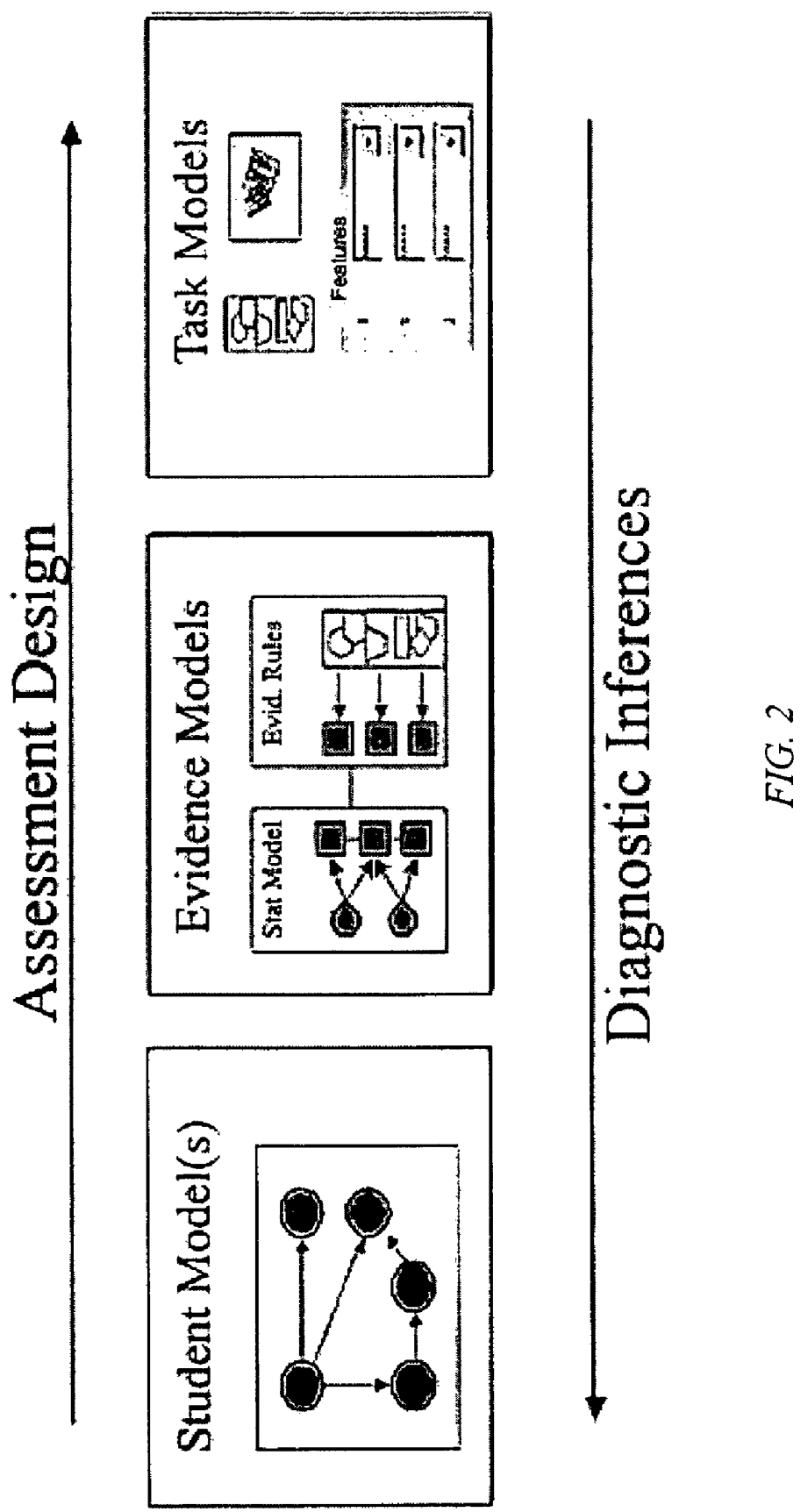
FIG. 2 depicts relationships among the ECD models according to an embodiment.

FIG. 2 depicts relationships among the ECD models according to an embodiment. As shown in FIG. 2, assessment design may flow conceptually from student models through evidence models to task models, although the flow may be less linear and more iterative in practice. Conversely, diagnosis or inference may flow in the opposite direction. In other words, when a diagnostic assessment task is administered, the action(s) performed by a student during the solution process may provide evidence that is analyzed by the evidence model. The results of this analysis may include scores and/or other data that are communicated to the student model to update relevant proficiencies. An adaptive algorithm may be invoked to select a new task to be presented to the student based on the updated proficiency values in the corresponding student

TABLE 1

Alignment of Adaptation Type by Learner/System Feature

| Feature | Microadaptation (i.e., domain-dependent) | Macroadaptation (i.e., domain-independent) |
| --- | --- | --- |
| Person Characteristic | System may adapt to fairly malleable person characteristics such as knowledge, skills, and abilities that are the focus of instruction and assessment. | System may adapt to fairly stable person characteristics such as cognitive variables, perceptual abilities, personality variables, and learning style. |
| Adaptive Decision | Microadaptive decisions may occur during instruction (through diagnostic assessment). | Macroadaptive decisions may occur mainly prior to instruction (based on pre-existing data sources or pre-instruction assessment). |
| Consequence of Adaptation | Decision may affect what content is presented (e.g., determination of when the student is ready to proceed to the next part of the curriculum). | Decision may affect how content is presented (e.g., differential sequencing or alternative presentation format). |
| Theoretical Underpinnings | Adaptation may be based on theoretical and empirical information relating to learning and pedagogical principles that provide information about what to instruct or assess and why. | Adaptation may be based on theory and research on ATIs, assessment validity and other information from individual learner differences. |

As such, well-founded diagnostic assessments of proficiencies may be developed. Good assessments may be used to obtain relevant information that permit inferences to be made regarding students' knowledge and skill states. Moreover, accurate inferences of current knowledge and skill states may support microadaptive decisions that promote learning.

Evidence-centered design (ECD) may attempt to obtain, among other things, clear answers to three basic assessment questions: (a) what is desired to be determined about persons model. The cycle may repeat until the tasks are completed, time has run out, mastery has been achieved and/or some other termination criterion has been met.

In this manner, a psychometrically sound approach for designing assessments and modeling student performance may be provided. The ECD approach may provide a framework for developing assessment tasks that are explicitly linked to claims about learner proficiencies via an evidentiary chain.

A student model may refer to a record of what a student is believed to know and/or not know in relation to some referent knowledge and skill map, which may be referred to as a proficiency model. A student model may be modeled using a Bayesian inference network (BIN). BINs may be employed to represent, monitor and update the student model and to compute probabilistic estimates of proficiency (e.g., the probability that a student has a "very strong" grasp of a particular concept may be 95%) at various points in time. A Bayesian approach to student modeling may be used in an e-learning system to inform microadaptive decisions—enabling the system to choose the best piece of content, such as the most helpful and informative assessment task, to present next.

An evidence model may be described in relation to the observable features of students' work products (or behaviors) that constitute evidence about proficiencies. Proficiencies may be represented as nodes or variables in the student model. Thus, evidence models may attempt to determine which behaviors and/or performances reveal targeted proficiencies, and what connections exists between those behaviors and the student model variables. An evidence model may thus define an argument regarding why and how the observations in a given task situation (i.e., student performance data) constitute evidence about student model variables. For example, an evidence model may assist in determining what is known about a student's "knowledge of U.S. state capitals" if the student can freely recall 40 of the 50 state capitals. The evidence model may also assist in determining whether such a performance is better or worse than matching 48 capitals to their appropriate state when each is displayed.

Evidence models may include evidence rules and statistical sub-models. An evidence rule may determine how the results of a given performance are extracted from (or identified in) a particular work product. Thus, evidence rules may emphasize how the student performs or responds. A statistical sub-model may express how the observable variables depend on or link to student model variables. As such, statistical sub-models may link the extracted data to targeted proficiencies denoting what the student knows and how well the student is believed to know it.

A given work product may yield one or more observable variables. For example, if a student writes a short essay, the essay may become the work product for a writing assessment task and may be evaluated in terms of various proficiencies, such as spelling, grammar, syntax and/or semantics. These proficiencies may be assessed and updated individually and/or may be considered as a more general "writing skills" proficiency. Accordingly, the evidence rules may differ to focus on individual or holistic rubrics. An exemplary holistic evidence rule for "highly proficient" writing may include: "The essay is clear and concise, with perfect spelling; and no grammar, syntax or semantic errors present."

Evidence models may thus represent an evidentiary chain between tasks and proficiencies. Moreover, a necessary condition for an evidence model may be that it shares the same work-product specifications as a particular task model. In other words, what the student produces in the task situation and what the evidence rules examine may be required to be the same.

Tasks may be the most obvious part of an assessment and may be used to elicit evidence (observables) about proficiencies (unobservables). A task model may provide a framework for describing the situations in which students act in terms of, for example, (a) the variables used to describe key features of a task, such as content, difficulty, and the like, (b) the presentation format, such as directions, stimuli, prompts, and the like, and (c) the specific work or response products, such as answers, work samples, and the like. As such, task specifications may establish what a student is asked to do, what kinds of responses are permitted, what types of formats are available, whether the student will be timed, what tools are allowed (e.g., calculators, dictionaries, word processors, etc.), and the like. Multiple task models may be employed in a given assessment.

Different task models may produce different tasks, which may vary along a number of dimensions (e.g., media type and difficulty level). For example, the following three tasks may define three levels of difficulty in a student model variable: "Find the common difference in an arithmetic sequence:"

EASY—Find the common difference for the following arithmetic sequence:

1, 7, 13, 19, 25, . . . Enter answer here: _____

INTERMEDIATE—Find the common difference for the following arithmetic sequence:

0.00, 0.49, 0.98, 1.47, 1.96, . . . Enter answer here: _____

DIFFICULT—Find the common difference for the following arithmetic sequence:

0.03, 0.95, 1.87, 2.79, 3.71, . . . Enter answer here: _____

Note that the relationship between student model variables and tasks such as those listed above may be that student model variables represent the concepts or skills being examined. The online manifestations of those variables may be the assessment tasks with which students interact and that elicit evidence about the variables. Thus, student model variables may be assessed (and their states inferred) in relation to a learner's performance on relevant tasks.

In an embodiment, the student model may be represented as a BIN. In an embodiment, one or more student model variables may have probabilities for each of, for example, three proficiency level states: low, medium, and high. For example, a student who struggles with a specific concept or skill (e.g., knows U.S. state capitals) may have the following probability distribution assigned to this variable: low ($p=0.85$), medium ($p=0.10$), high ($p=0.05$). More or fewer proficiency level states may be used for each student model variable within the scope of this disclosure as will be apparent to those of ordinary skill in the art.

In an embodiment, additional nodes may be used to provide granulated information regarding a student's abilities. For example, if knowing each state and its capital were each targeted as being important, fifty additional nodes may be represented (i.e., one per state, residing under the parent node: "knows U.S. state capitals"). In an embodiment, other proficiency level states may exist between the individual states and the global (parent) node as well. For example, additional nodes may be used to assess students' knowledge of state capitals by region (e.g., "mid-Atlantic states," "New England states"). The student model may be used to reflect this hierarchy, and evidence may be collected and included at each corresponding proficiency level state to answer questions regarding the student's understanding of the subject matter. Each variable may include its own probability distribution. For the distribution described above (low=0.85, medium=0.10, high=0.05), the distribution may be interpreted to mean, "It is likely this student currently does not know all of the U.S. state capitals."

Such probability distributions may be dynamically updated based on the current, specific performance data (evidence) that influence the student model. Maintaining an updated record of proficiency levels may help determine proper interventions. For example, students performing lower than expectations (students having a high probability of a low proficiency level) may benefit from remedial instruction; students performing consistently with expectations (students having a high probability of a medium proficiency level) may need to continue practicing the current skill/concept; and those performing higher than expectations (students having a high probability of a high proficiency level) may be ready to move to more advanced material. However, a more concrete method for determining the most suitable task to next present to a learner at a given time may be determined.

In an embodiment, the next task to be selected may be the task for which the expected weight of evidence is maximized. The expected weight of evidence (WE) may be defined as:

$$WE(H:T) = \sum_{j=1}^{n} \log\left[\frac{P(t_j \mid h)}{P(t_j \mid \bar{h})}\right] P(t_j \mid h).$$

Here, T may refer to a task performance, and H may refer to the main hypothesis. Either the main hypothesis is true (h) or the alternative hypothesis is true ($\bar{h}$). The variable n may refer to the number of possible outcomes for each task. In an embodiment, two possible outcomes may exist for each task: correct or incorrect. Other embodiments may include a plurality of possible outcomes within the scope of this disclosure. The variable j may represent the outcome index for a particular task, and the variable $t_j$ may be the value of the outcome.

In an embodiment, the weight of evidence for a particular task outcome may be the log-odds ratio of the probability that a particular outcome will occur given that the hypothesis is true, to the probability that the same outcome will occur given that the alternative hypothesis is true. Thus, the expected weight of evidence, WE(H:T), for a particular task may be the average weight of evidence across possible task outcomes.

With respect to the earlier example, when an instructional unit on U.S. state capitals has been completed, an assessment may be administered to determine whether the students demonstrate high levels of proficiency on tasks assessing relevant content. A hypothesis of interest (h) may be that the students are high on their state capital proficiencies, and the alternative hypothesis ($\bar{h}$) may be that they are not high.

In an embodiment, each student may take the assessment one task at a time. In an embodiment, upon the completion of each task by a student, two possible outcomes may exist: either the student solved it correctly or incorrectly ($t_j$=1 or 0). Tasks may be rank-ordered based on the difficulty levels for all of the tasks. The difficulty levels may be based on, for example, familiarity, frequency and/or saliency data. For example, if the assessment were administered in New Jersey, an easy item may include identifying Trenton as New Jersey's state capital. A more difficult item may include, for example, identifying the capital of South Dakota.

Determining a proper question to ask first may depend upon the goal of the assessment. For example, if the goal of the assessment is to determine whether the material has been mastered by a majority of the students, asking a particularly easy question that each student is likely to answer correctly may not provide additional information regarding the students' proficiency levels. Accordingly, it may be desirable to pose a more difficult question. Determining whether an additional question should be posed to a student and, if so, the difficulty level of such a question may be based on the student model proficiency levels for the particular student, as updated based on the outcome of the posed question, and on the one or more goals of the assessment as a whole.

On the basis of each outcome event, and in conjunction with the difficulty of the current task and the current proficiency level values in the student model, which are unique to each student based on their responses and any prior information that had been received by the model, the WE may be calculated for the remaining set of assessment tasks. Accordingly, the next task selected (if any) may be the task that has the highest WE value (i.e., the task providing the most information in relation to the specific hypothesis).

For example, if a student has a low proficiency level and misses a difficult item pertaining to the proficiency, the next task that may be selected (via the WE calculation) may be one directed to assessing the same proficiency, but including an easier representation. For example, in the example described above, the student may initially be asked to recall the capital of South Dakota in response to an open-ended prompt (i.e., "What is the capital of South Dakota?"). This may represent a difficult task. If the student answers incorrectly, the student may be presented with an easier, forced-choice variant, such as, "Which city is the capital of South Dakota: (a) San Francisco, (b) Pierre, (c) Baltimore?"

Using WE may have advantages of being multidimensional, dynamic and flexible. In other words, WE may work with multidimensional BINs and allow estimation of a variety of student model variables (rather than being limited to a single, general proficiency). Moreover, the model for a particular student may evolve over time by updating its variable estimates in response to actual performance data. Finally, the WE approach may allow specification of a hypothesis of interest as opposed to requiring a default or fixed hypothesis.

Figure 3:
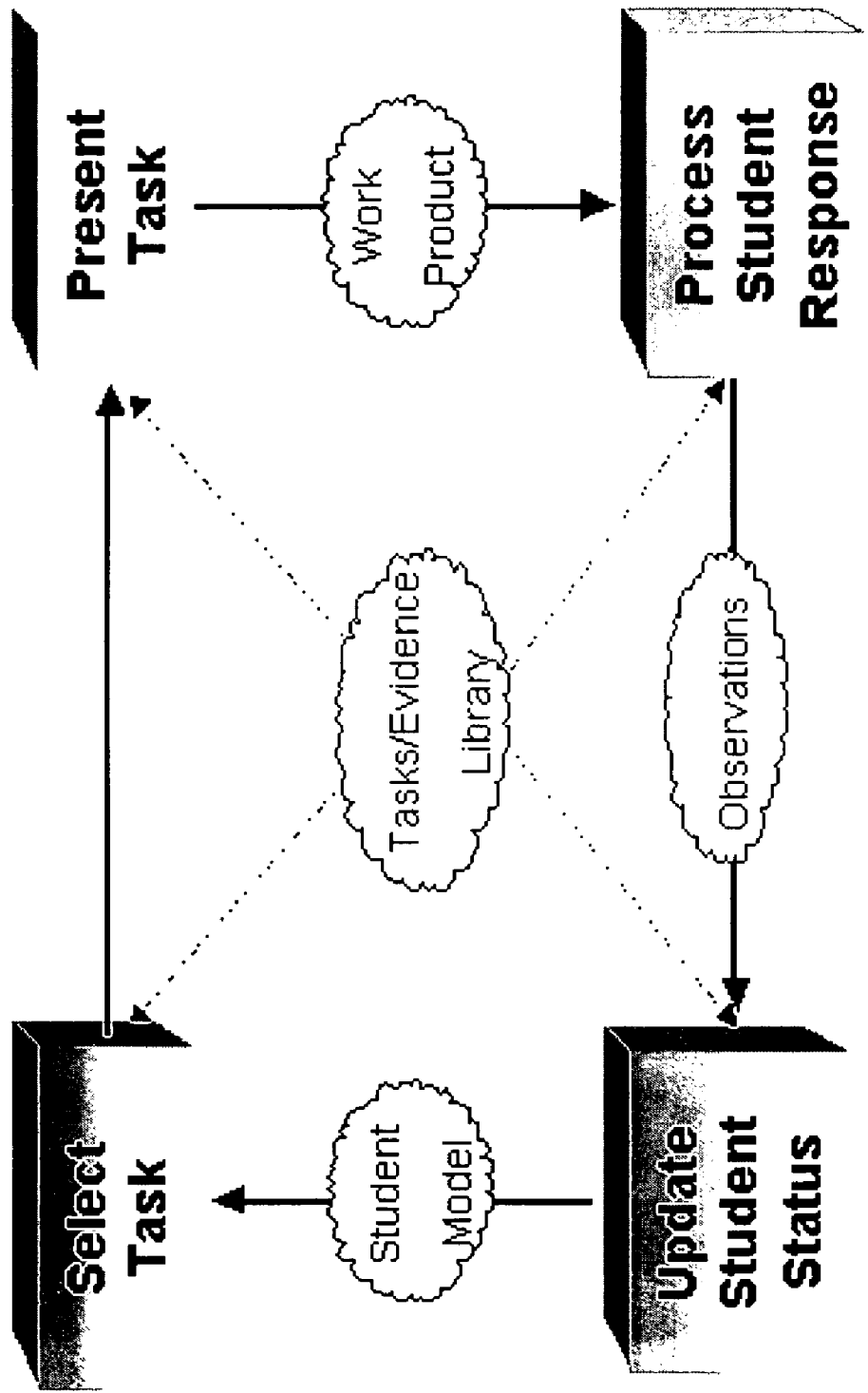
FIG. 3 depicts a flow diagram for an exemplary method of determining a next task based on the expected weight of evidence according to an embodiment.

FIG. 3 depicts a flow diagram for an exemplary method of determining a next task based on the expected weight of evidence according to an embodiment. The weight of evidence may be calculated for each task. The task with, for example, the highest WE may be selected. The selected task may be administered to a student, and evidence may be collected. In an embodiment, the evidence may include the response to the selected task, other information pertaining to the task and/or to the student and/or any other relevant information. The response may be scored based on a heuristic. The student model, such as a BIN, may be updated to include the received information and/or evidence. It may be determined whether obtaining additional information would be beneficial to assessing the proficiency level of a student. If additional tasks would be beneficial, the process may repeat by calculating the weight of evidence for each remaining task (i.e., each task that has not already been administered to the student). Otherwise, the process may terminate. Termination may also occur if a threshold is exceeded, if time runs out and/or if no more tasks remain for assessing proficiency.

In an embodiment, two stages may characterize the design of an ECD-based assessment: domain analysis and domain modeling. Domain analysis may include a process of identifying, collecting, organizing and/or representing the relevant information in a domain based on information received from domain experts, underlying theory, supplementary material and the like. In domain modeling, relationships may be established among one or more student proficiencies, the evidence for the one or more proficiencies and/or the kinds of tasks that elicit relevant evidence. Graphic representations and schema may be used to convey complex relationships.

In an embodiment, the domain analysis phase may include considering the range of constructs that may be measured by the assessment. Relevant constructs may be identified via expert practitioners, supporting materials, research articles, state and national testing standard and/or practical requirements and constraints. For example, when designing an assessment that covers eighth-grade mathematics, teachers teaching students at that grade level may be consulted to determine the appropriate subject matter for the assessment. In an embodiment, a practical constraint may include limiting the scope of the assessment to 2-3 weeks of material, which may correspond to the approximate length of time that most teachers will spend on a classroom unit of instruction.

In an embodiment, "sequences as patterns" may be selected as a topic for an assessment. Prerequisites for the subject and the requisite skills to assess may be determined. Sample tasks and supplementary materials may be developed to assist in designing the instructional unit. Further, a determination of the proficiencies that may be appropriate to include on a pretest and/or an interim test designed for the instructional unit on sequences may be developed.

Once the breadth and depth of the proficiencies to test are determined, domain modeling may be performed. In the domain modeling phase, assessment designers may use information from the domain analyses to establish relationships among proficiencies, tasks and evidence. The designers may develop high-level sketches of the interrelationship among the proficiencies that are consistent with what they have learned about the domain. Ultimately, the designers may create graphic representations to convey these complex relationships. The designers may further develop prototypes to test assumptions.

Figure 4:
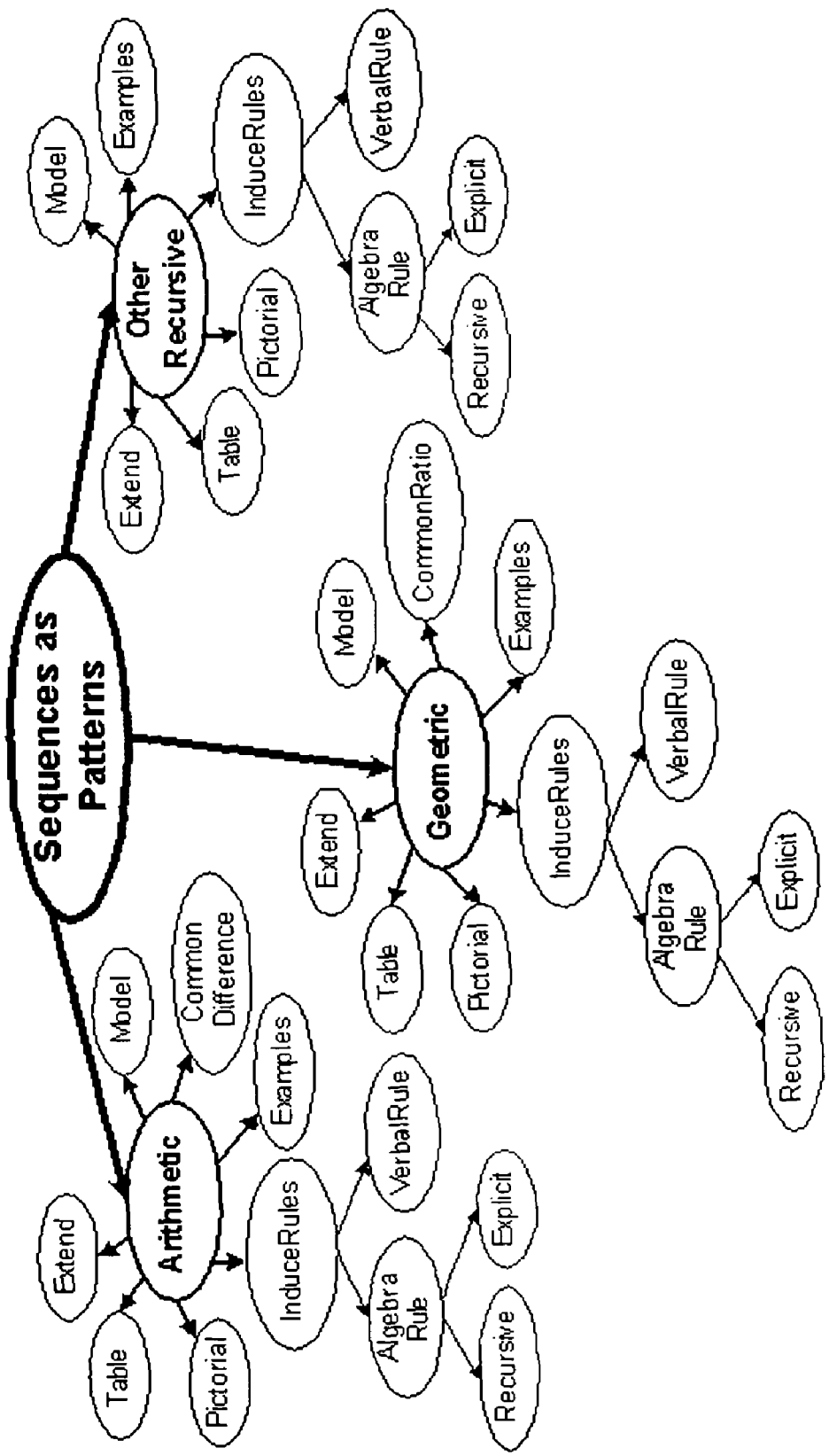
FIG. 4 depicts an exemplary student model according to an embodiment.

Key proficiencies and the manner in which they should be linked and organized may be determined for a student model. For example, a graphic representation may be created defining links between proficiencies. Once the student model is established, the evidence and task models may be defined. FIG. 4 depicts an exemplary student model according to an embodiment. Features of the student model depicted in FIG. 4 may include the following: 1) the model may be hierarchical. Each child node may include only one parent node. 2) The root node that represents the proficiency, sequences as patterns, may have three child nodes. Each node may correspond to a different sequence type. 3) The proficiencies under each sequence type in FIG. 4 may be identical except that no analog may exist for common difference (arithmetic) or common ratio (geometric) in other recursive sequences. This may be because the other recursive sequences proficiency may be more broadly defined and may pertain to sequences taught at the eighth-grade level that are recursively defined but are neither arithmetic nor geometric. Examples of other sequences may include Fibonacci numbers, triangular numbers, and simple repeating patterns. Non-hierarchical relationships, different numbers of child nodes per parent node and/or different proficiencies among child nodes may be implemented in a student model within the scope of this disclosure. In other words, FIG. 4 is merely exemplary of a student model and not limiting on the scope of this disclosure, which includes the embodiment shown in FIG. 4 and numerous other embodiments.

Brief descriptions of exemplary student proficiencies are provided in Table 2 below. In an embodiment, three levels of proficiency (e.g., low, medium and high) may be associated with each student variable. For each proficiency level of each student model variable, a claim may be specified describing what the student should know and be able to do. An exemplary claim for a student with a high level of proficiency at finding explicit formulas for geometric sequences (i.e., the node labeled explicit in the geometric branch of the student model of FIG. 4) may include: "The student can correctly generate or recognize the explicit formula for the $n^{th}$ term in a geometric sequence. The student can do this in more challenging situations, for example, when the signs of the terms in the sequence are alternating, or when the starting term and the common ratio are unequal."

TABLE 2

Example Proficiency Descriptions

| Tree level | Name in tree | Full name | Description |
|---|---|---|---|
| 1 | Arithmetic | Solve problems with arithmetic sequences | A student with this set of proficiencies can work with arithmetic sequences at the eighth-grade level. An arithmetic sequence may be defined by a starting term $a_1$ and a common difference, d. The terms of an arithmetic sequence may be as follows: $a_1, a_1 + d, a_1 + 2d, a_1 + 3d, \ldots, a_1 + (n-1)d$ |
| 2 | Pictorial | Represent pictorial patterns as sequences (arithmetic, geometric, other recursive) | A student with this set of proficiencies can interpret a graphic (e.g., a succession of patterns of dots) as a sequence of a particular type. |
| 3 | Algebra rule | Generate a rule for a sequence as a function or expression (arithmetic, geometric, other recursive) | A student who has this skill can express rules of generating terms in a sequence algebraically; the rule in this case takes the form of an algebraic expression. |
| 4 | Explicit | Generate a formula for the nth term of a sequence (arithmetic, geometric, other recursive) | A student with this proficiency can use an algebraic expression to represent the nth term of a sequence. For example, $5 + 2(n-1)$ is an explicit rule for the nth term of an arithmetic sequence with an initial term of 5 and a common difference of 2. In general, an explicit rule for the nth term of an arithmetic sequence is: $a_n = a_1 + (n-1)d$ (where d is the common difference) and an |

TABLE 2-continued

Example Proficiency Descriptions

| Tree level | Name in tree | Full name | Description |
|---|---|---|---|
| | | | explicit rule for the nth term of a geometric sequence is: $a_n = a_1 r^{n-1}$ (where r is the common ratio). |

As described earlier, the evidence model may specify behaviors that indicate the level of mastery associated with a particular proficiency. The evidence model may include, for example, two parts: evidence rules and a statistical sub-model. The evidence rules may be characterized at each of the three levels, per proficiency. Evidence associated with each level for two proficiencies is shown in Table 3.

TABLE 3

Evidence Rules Specified for Two Sample Proficiencies, at Each Level of Mastery

| Proficiency | Evidence Rules for High Proficiency Level | Evidence Rules for Medium Proficiency Level | Evidence Rules for Low Proficiency Level |
|---|---|---|---|
| Represent pictorial patterns as arithmetic sequences | The student can produce a pattern that represents an arithmetic sequence, can recognize arithmetic sequences represented as pictorial patterns, and can recognize the equivalence between numeric and pictorial representations. | The student recognizes that the pictorial patterns have mathematical significance, but cannot consistently explain how or why. | The student does not infer any mathematical significance from the pictorial patterns. |
| Generate and justify examples of geometric sequences | The student can generate geometric sequences. If a list of terms is given, all terms in the sequence are correct. If a formula is given, it is well formed and correctly specifies an appropriate example. | The student generates something that may be a sequence but not necessarily a geometric sequence, or generates a sequence that is geometric but has some incorrect terms due to arithmetic errors, or generates a formula that is close to expressing the correct sequence. | The student generates something that does not express a sequence or generates a sequence that does not include a multiplicative operation as at least part of the rule. |

The statistical sub-model may define a set of probabilistic relationships among the student model variables (nodes) and observables. Prior probabilities (priors) may be estimated for the parent node (i.e., sequences as patterns). In cases where the prior distribution is not known in advance, values of approximately 1/n may be assigned for each of the n possible states (i.e., 0.33, 0.33 and 0.34 for 3 states). The priors may specify the probabilities that a student is in the low, medium and high states for the parent node proficiency.

In an embodiment, for each of the other nodes in the model, two values may be entered. One value may be an indicator of the relative difficulty of the tasks associated with that particular node, and the other may be a correlation that indicates the strength of the relationship between the node and its parent node. These values may be used to produce a set of conditional probability tables, where one table may exist for each node except for the root node. Because each node in the exemplary embodiment has three levels associated with it, each conditional probability table may have nine probability estimates (3 parent node levels multiplied by 3 child node levels). For example, a cell in the table associated with the "model" node under "arithmetic" sequences may indicate the probability (expressed as a value between 0 and 1) for high-level proficiency for tasks of type "model" given a medium-level proficiency for "arithmetic" sequences. Students with high proficiency levels may be considered likely to solve both hard and easy tasks, while students with low proficiency levels may be considered likely to solve only easy tasks.

A task model may provide a specification of the types of tasks that measure the behaviors described in the evidence model. The task model may describe the features for each type of task included in an assessment. For example, the task model may describe different item types included in an assessment, the nature of the stimulus, the stem and/or the options (if any). The task model may also describe how the student is required to respond to each type of task. For example, a multiple choice item may require the student to select an option, while a numeric entry item may require a student to enter a number instead. An exemplary item may include the following: "Find the missing terms in the following arithmetic sequence: 4.68, _____, _____, 13.74, 16.76, 19.78." The item type, the nature of the stem and/or the number of responses may be exemplary task model variables included in the task model specification. The exemplary item above may be a numeric entry item because the student is required to enter numbers rather than selecting an option. Two responses may be required for the above item (one for each blank). As shown, the stem may include both numbers and text, but no graphics. The stem may include one or more words, numbers, pictures and/or tables.

In an embodiment, a plurality of tasks may be included per proficiency at each level of difficulty. In FIG. 4, the thirty-two proficiencies may represent the children of the main nodes (i.e., Sequences as Patterns, Arithmetic, Geometric and Other Recursive sequences). Accordingly, if two tasks are included per proficiency at each level of difficulty, 192 tasks (i.e., 32 proficiencies, multiplied by 3 levels and 2 tasks per level) are required for the particular embodiment shown in FIG. 4. Tasks may be selected from previously generated task items or may be developed independently. In an embodiment, tasks may be developed using quantitative item models, such as the item models described below. In an embodiment, items may be automatically generated and formatted from the item models using software designed for this purpose.

The term item model may refer to a class of content equivalent items that describe an underlying problem structure and/or schema. A quantitative item model may be a specification for a set of items that share a common mathematical structure. Items in a model may also share one or more formats, variables and/or mathematical constraints. A set of item models may be used to define the task model for an assessment. The variables in a quantitative item model may specify the range of permissible values that may replace the variable in an individual item. The constraints in a quantitative item model may define mathematical relationships among the variables. The number of items described by an item model may depend on how the variables and constraints have been defined.

Once an item model is defined, instances that are described by the item model may be automatically generated. A description of an item model may be programmed into software that generates the instances. In addition to providing an organized structure for item development, an automatic approach to item generation may provide considerable practical advantages because the generating software may perform the necessary computations and format the items automatically. In an embodiment, ECD may be used as the guiding framework to inform the structure of item models.

Table 4 may depict a simplified example of an item model with two items that could be generated using the model. This item model may generate easy items that link to the "extend" node under "arithmetic" sequences.

TABLE 4

An Example of an Item Model and Two Items

| | Model template | Variables and constraints |
|---|---|---|
| Model | Extend the arithmetic sequence by finding the next term: A1, A2, A3, . . . | A1 is an integer between 1 and 9, inclusive D is an integer between 2 and 9, inclusive A2 = A1 + D A3 = A2 + D Key = A3 + D |
| Example item 1 | Extend the arithmetic sequence by finding the next term: 1, 4, 7, . . . | A1 = 1 D = 3 4 = 1 + 3 7 = 4 + 3 10 = 7 + 3 |
| Example item 2 | Extend the arithmetic sequence by finding the next term: 5, 14, 23, . . . | A1 = 5 D = 9 14 = 5 + 9 23 = 14 + 9 32 = 23 + 9 |

With respect to macroadaptation, an exemplary adaptation may include accommodating for visual disabilities, i.e., blindness and low vision. In an embodiment, content may normally be presented visually and may require students to use, for example, a mouse, a keyboard and/or another input device to answer, for example, single selection multiple-choice items. In an embodiment, students may be required to use a keyboard and/or another input device to answer, for example, numeric entry items. One or more accommodations for making test content accessible to individuals with visual disabilities may be implemented. For example, individuals with low vision may use screen enlargement software, which may allow users to enlarge a portion of a display screen. Moreover, individuals who are completely blind or who are otherwise unable to benefit from screen enlargement software may be able to access an audio rendering of content and/or tactile graphics (e.g., raised-line drawings).

The usability of specific accommodations may be considered when determining the validity of test scores (i.e., the degree to which accumulated evidence and theory support specific interpretations of test scores entailed by proposed uses of a test) obtained under accommodated conditions. For example, it may be important to ensure that the accommodation is usable and overcomes one or more accessibility barriers. However, it may also be important to ensure that an accommodation does not provide an unfair advantage for the person that receives the accommodation. For example, allowing a person with a math-related disability (e.g., dyscalculia) to use an electronic calculator on a mathematics test may make the test accessible and usable; however, if the test is intended to measure mental computation, the electronic calculator accommodation may tend to provide an unfair advantage for that person, thereby potentially invalidating the results.

An ECD-based validity framework may be used that closely examines evidentiary arguments. Careful attention to the definition of the construct (e.g., skills or abilities that are or are not part of what is intended to be measured) may be required.

The exemplary "sequences as patterns" assessment may be used to measure cognitive abilities (e.g., reasoning and knowledge of various sequences) rather than assessing the senses of sight, hearing and/or touch. As such, it may not be unreasonable, for example, to provide accommodations that reduce or eliminate the requirements for sight (imposed by the visually displayed text and graphics under standard testing conditions) and instead rely on other capabilities, such as hearing and touch, when delivering test content.

Another relevant piece of evidence for this assertion may be that the ability to decode (decipher words from characters) may not be considered to be part of "knowledge of sequences." If decoding were defined as being an essential part of that construct, use of an audio accommodation may threaten the validity of the assessment; specifically, the audio presentation may read whole words at a time thereby reducing or eliminating the need for the student to demonstrate their decoding ability.

In an embodiment, ensuring valid assessment results may depend on a plurality of additional and/or alternate factors. For example, having adequate practice and familiarization materials, adequate time and the like may be required as accommodations.

In an embodiment, the ability to work quickly may not be essential to "understanding sequences as patterns." Furthermore, a person who is blind and using tactile or audio-tactile graphics may be likely to require more time to complete an assessment than a non-disabled person receiving the test under standard conditions. Accordingly, extra testing time may be an appropriate testing accommodation.

Audio rendering of content may be termed a "read-aloud" accommodation because it involves reading the content aloud to the student. The accommodation may be implemented via a live human reader, prerecorded human audio and/or synthesized speech. In an embodiment, the audio rendering may verbalize text content (i.e., straight text) and non-text content, such as images, audio and/or video/animations. As discussed above, non-text content may be translated into text equivalents, which seek to convey the same meaning as the non-text content through text. An audio rendering of a mathematics test may also include specially scripted descriptions of mathematical expressions and tables. If the audio rendering has been crafted to convey all necessary content, a person who is visually disabled may use it without relying on, for example, tactile graphics. However, understanding graphical material (pictures, graphs, etc.) may be significantly easier when an audio description is supplemented with tactile graphics. Tactile graphics may be printed or pressed onto paper or plastic and may be felt with the fingertips. Tactile graphics may include Braille labels. Hard copy Braille versions of test content may provide an alternate accommodation; however, many individuals who are blind do not read Braille or have very limited Braille literacy.

In an embodiment, a hybrid method of access combining tactile graphics and audio may be used. In such an audio-tactile graphics embodiment, the student may touch a specific location on a tactile graphic and hear a description pertaining to that location. The student may quickly navigate from location to location to hear as much or as little of the description as desired. Such audio-tactile graphics may facilitate access to graphics-intensive content. In an embodiment, a tactile tablet (such as the Talking Tactile Tablet made by Touch Graphics, Inc. of New York, N.Y.) may be used to implement a system using audio-tactile graphics.

The tablet may provide audio (read-aloud), tactile and visual modification capabilities. Such capabilities may be particularly useful for test content that uses graphics, tables and mathematical expressions, which are often difficult to convey via words alone.

Figure 5:
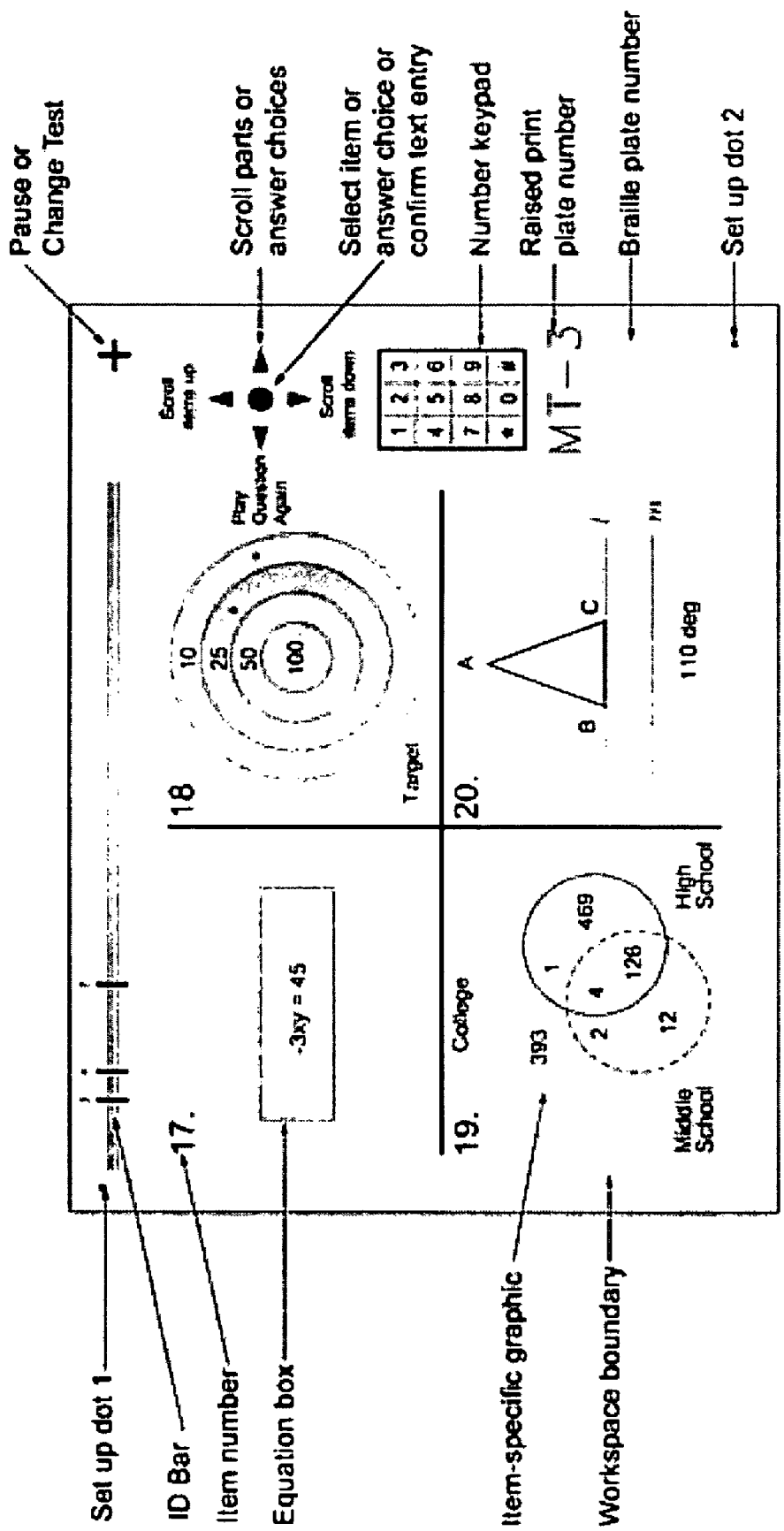
FIG. 5 depicts a tactile graphic for use as an exemplary accommodation according to an embodiment.

Developing an application using a tactile tablet may require the development of a tactile graphic. In an embodiment, a tactile graphic may be a sheet of hard plastic that uses raised lines and textures to represent points, lines and regions of a graphic, such as is shown in FIG. 5. A special printing process may be used to print the graphical material in ink on the tactile graphic to assist visually disabled individuals with some sight. In an embodiment, some features of the graphic may by an external personal computer. A developer may specify the active regions on the graphic in software and may map each active region to one or more prerecorded audio segments.

For example, a student using such a system may press on the angle depicted in the lower-right corner of FIG. 5 and hear the words "110 degrees" in prerecorded audio. This may enable a student who has a visual impairment (or another disability that impairs processing of visually-rendered content) to receive specific and interactive audio descriptions of content that would ordinarily be presented only visually. A tactile tablet system may allow the student to navigate through the test and select an answer using tactile (raised-line) controls on the tablet. In an embodiment, a student using the tactile tablet system may only use a keyboard and/or other input device, for example, when answering constructed-response items.

In an embodiment, the basic audio-tactile capabilities of the tactile tablet system may be augmented with capabilities designed to make the system suitable for achievement testing. For example, the system may enable a test and item directions to be received, navigation between and within items to be performed, typed responses to be received (if applicable) and answers to be confirmed. Synthesized speech may permit students to hear an audio representation of a response as it is entered.

In an embodiment, the microadaptation and macroadaptation modules may be integrated into a single system. For example, a microadaptation implementation that selects content for presentation to a learner during as part of an assessment may be integrated with a macroadaptation module such as the tactile tablet. Accordingly, blind and/or other visually disabled learners may benefit from the use of an adaptive content presentation unit based on the student model as updated by responses provided by the learner. In an embodiment, different microadaptation and/or macroadaptation modules may be used. For example, a module that translates an assessment into a foreign language for non-native speakers may be utilized as a macroadaptation module for an assessment.

Figure 6:
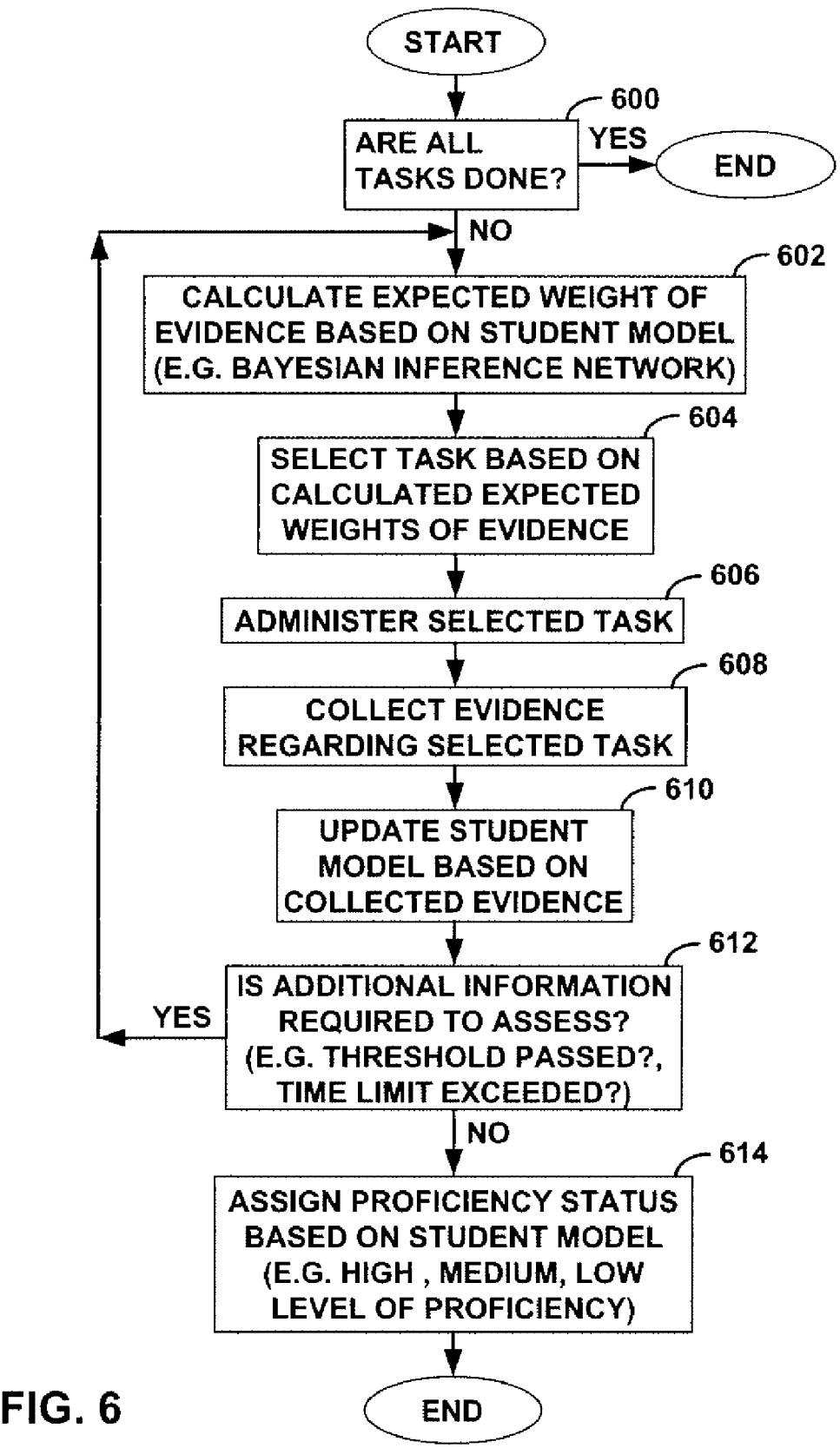
FIG. 6 depicts a flow diagram for the overall method of the invention according to an embodiment.

FIG. 6 depicts a flow diagram for the overall method of the invention according to an embodiment. In step 600, the embodiment determines if all of one or more tasks have been performed, and if so terminates execution. Otherwise, the embodiment calculates in step 602 the expected weight of evidence for the task based on a student model pertaining to a student; the student model preferably comprises a Bayesian inference network. The embodiment selects in step 604 a task based on the calculated expected weights of evidence, then administers the selected task to the student in step 606. In step 608, the embodiment collects evidence regarding the selected task. In step 610, the embodiment updates the student model pertaining to the student based on the evidence. In step 612 the embodiment determines whether additional information is required to assess the student. The determining may comprise determining whether a threshold has been passed, or determining whether a time limit has been exceeded, for example. If additional information is required, the embodiment returns to step 602, otherwise proceeds in step 614 to assign a proficiency status to the student based on the student model. The proficiency status may comprise one or more of a high level of proficiency, a medium level of proficiency, and a low level of proficiency. The student model comprises one or more variables, wherein each variable corresponds to a proficiency for the student, wherein each variable includes a plurality of probabilities, wherein each probability corresponds to the likelihood that the student has a particular proficiency level for the proficiency.

Figure 7:
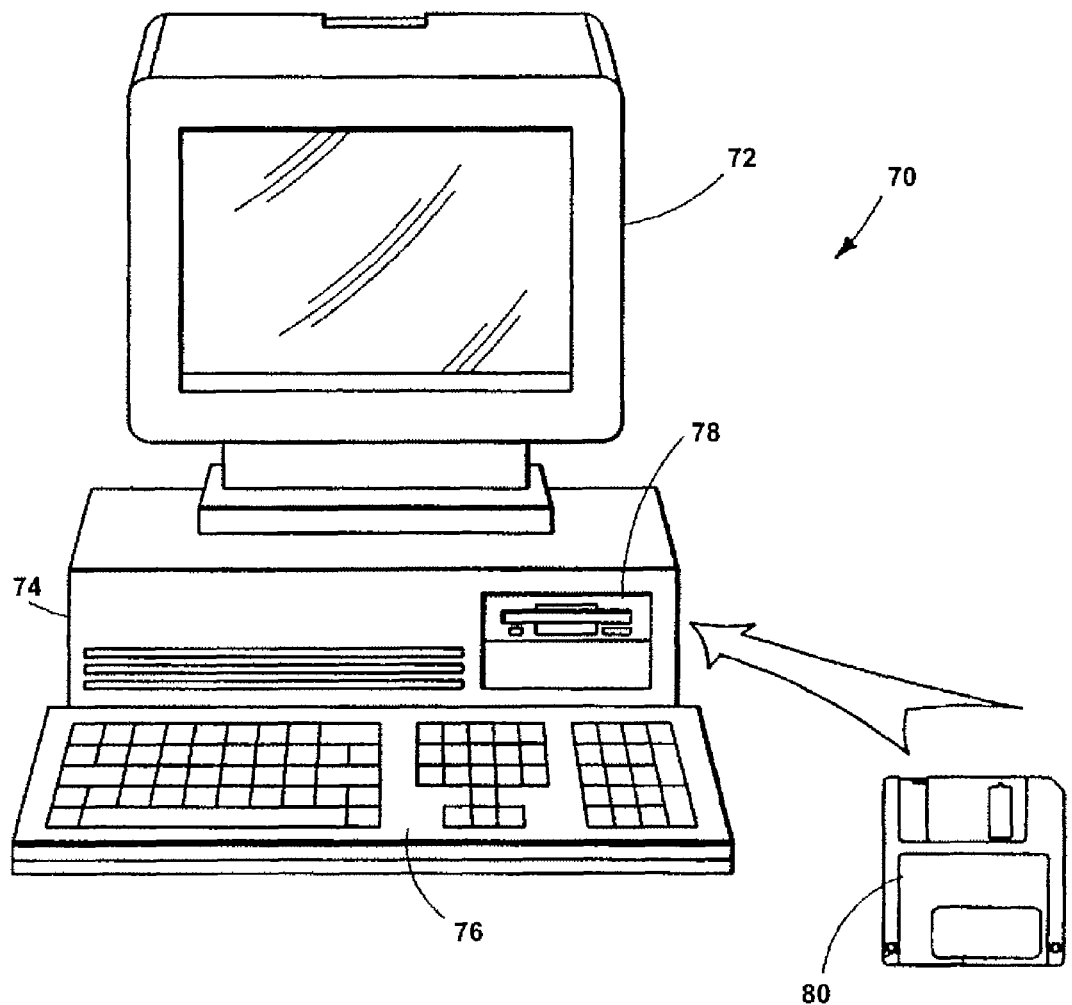
FIG. 7 depicts a typical computer system including a processor, and an exemplary processor-readable storage medium according to an embodiment.

FIG. 7 depicts a typical computer system 70 including a processor, and an exemplary processor-readable storage medium 80 according to an embodiment. Computer system 70 conventionally includes a monitor 72, a main processor section 74, a keyboard 76, and a portable storage medium input mechanism (e.g. mini-disk drive) 78. Processor-readable storage medium 80 may include but is not limited to a floppy disk, a mini-disk, a CD-ROM, a DVD-ROM, flash memory, data tape, and other conventional storage media as may be known to those of ordinary skill in the art.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

What is claimed is:

1. A computer-implemented method of administering an assessment to a student, the method comprising:

for one or more tasks, calculating an expected weight of evidence using a computer processor for the task based on a student model pertaining to a particular student, wherein the student model comprises one or more variables, wherein each of the one or more variables corresponds to a proficiency of the student and is based on student specific information collected prior to the assessment, wherein each of the one or more variables includes a probability of a plurality of probabilities, wherein each of the plurality of probabilities corresponds to a likelihood that the student has a particular proficiency level, wherein the expected weight of evidence is calculated based on the one or more variables corresponding to the proficiency for the particular student and the student specific information collected prior to the assessment;

selecting one of the one or more tasks based on the calculated expected weights of evidence using the computer processor;

administering the selected task to the student;

collecting evidence regarding the selected task;

updating the student model pertaining to the student based on the evidence using the computer processor;

determining whether additional information is required to assess the student using the computer processor;

if so, repeating the above steps; and if not, assigning a proficiency status to the student based on the student model using the computer processor.

2. The method of claim 1 wherein the evidence comprises a scored response to the selected task.

3. The method of claim 1, further comprising:

scoring a response to the selected task.

4. The method of claim 1 wherein the student model comprises a Bayesian inference network.

5. The method of claim 1 wherein determining whether additional information is required to assess the student comprises determining whether a threshold has been passed.

6. The method of claim 1 wherein determining whether additional information is required to assess the student comprises determining whether a time limit has been exceeded.

7. The method of claim 1 wherein a status of the proficiency comprises one or more of the following:

a high level of proficiency;

a medium level of proficiency; and a low level of proficiency.

8. A non-transitory computer readable storage medium containing one or more program instructions for administering an assessment to a student, the programming instructions, when executed, causing a computer processor to execute steps comprising:

for one or more tasks, calculating an expected weight of evidence for the task based on a student model pertaining to a particular student, wherein the student model comprises one or more variables, wherein each of the one ore more variables corresponds to a proficiency of the student and is based on student specific information collected prior to the assessment, wherein each of the one or more variables includes a probability of a plurality of probabilities, wherein each of the plurality of probabilities corresponds to a likelihood that the student has a particular proficiency level, wherein the expected weight of evidence is calculated based on the one or more variables corresponding to the proficiency for the particular student and the student specific information collected prior to the assessment;

selecting one of the one or more tasks based on the calculated expected weights of evidence;

administering the selected task to the student;

collecting evidence regarding the selected task;

updating the student model pertaining to the student based on the evidence;

determining whether additional information is required to assess the student;

if so, repeating the above steps; and if not, assigning a proficiency status to the student based on the student model.

9. The computer readable storage medium of claim 8 wherein the evidence comprises a scored response to the selected task.

10. The computer readable storage medium of claim 8, further containing one or more programming instructions for scoring a response to the selected task.

11. The computer readable storage medium of claim 8 wherein the student model comprises a Bayesian inference network.

12. The computer readable storage medium of claim 8 wherein determining whether additional information is required to assess the student comprises one or more programming instructions for determining whether a threshold has been passed.

13. The computer readable storage medium of claim 8 wherein determining whether additional information is required to assess the student comprises one or more programming instructions for determining whether a time limit has been exceeded.

14. The computer readable storage medium of claim 8 wherein a status of the proficiency comprises one or more of the following:

a high level of proficiency;

a medium level of proficiency; and a low level of proficiency.

15. The method of claim 1 wherein calculating the expected weight of evidence comprises calculating $$\sum_{j=1}^{n} \log\left[\frac{P(t_j \mid h)}{P(t_j \mid \bar{h})}\right] P(t_j \mid h)$$

wherein n is a number of potential outcomes for a particular task, j is an outcome index for the task, $t_j$ is a value corresponding to outcome j, $P(t_j|h)$ is a probability that the outcome occurs if a hypothesis is true, and $P(t_j|\bar{h})$ is the probability that the outcome occurs if the hypothesis is false.

16. The computer readable storage medium of claim 8 wherein calculating the expected weight of evidence comprises one or more programming instructions for calculating $$\sum_{j=1}^{n} \log\left[\frac{P(t_j \mid h)}{P(t_j \mid \bar{h})}\right] P(t_j \mid h)$$

wherein n is a number of potential outcomes for a particular task, j is an outcome index for the task, $t_j$ is a value corresponding to outcome j, $P(t_j|h)$ is a probability that the outcome occurs if a hypothesis is true, and $P(t_j|\bar{h})$ is the probability that the outcome occurs if the hypothesis is false.

17. The method of claim 1 comprising calculating expected weights of evidence for remaining tasks of the assessment based upon the updated student model, the student model being updated based upon evidence received in response to a question of the assessment.

18. The method of claim 17 comprising selecting a next task relating to a same proficiency as a prior task, next task having a different representation than the prior task, the student model being updated based upon evidence associated with the prior task.

19. The computer readable storage medium of claim 8 comprising calculating expected weights of evidence for remaining tasks of the assessment based upon the updated student model, the student model being updated based upon evidence received in response to a question of the assessment.

20. The computer readable storage medium of claim 19, the processing instructions, when executed, causing the processor to select a next task relating to a same proficiency as a prior task, next task having a different representation than the prior task, the student model being updated based upon evidence associated with the prior task.

\* \* \* \* \*